No. 817,931. PATENTED APR. 17, 1906.
N. P. NOBEN & E. E. WANG.
ROTARY BEATER FOR THRESHING MACHINES.
APPLICATION FILED AUG. 7, 1905.
2 SHEETS—SHEET 1.
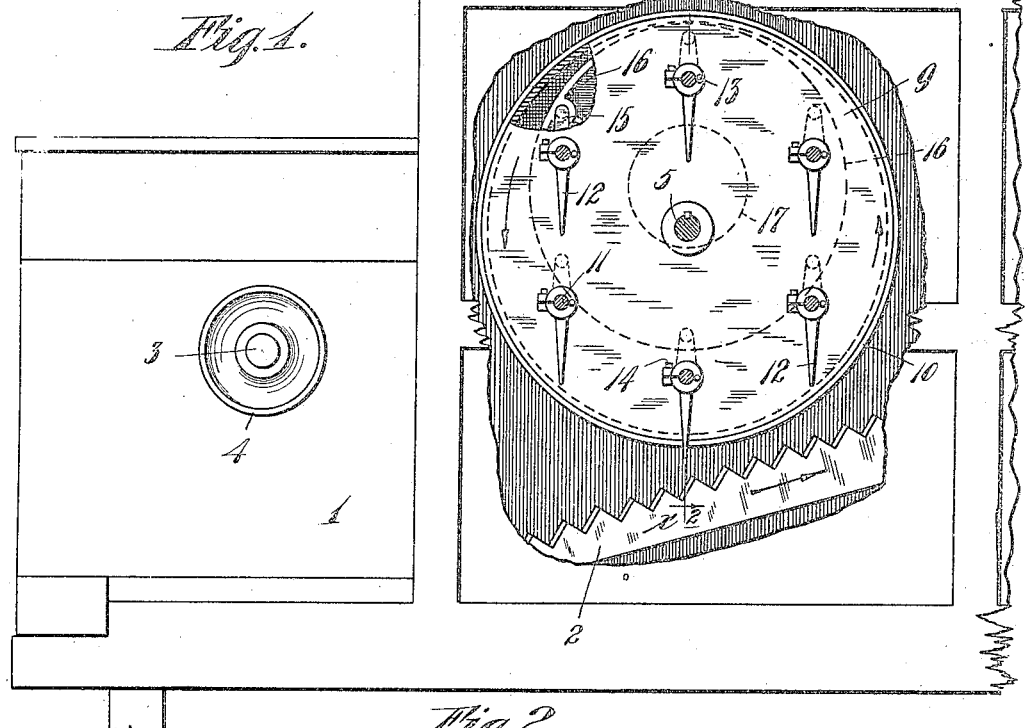
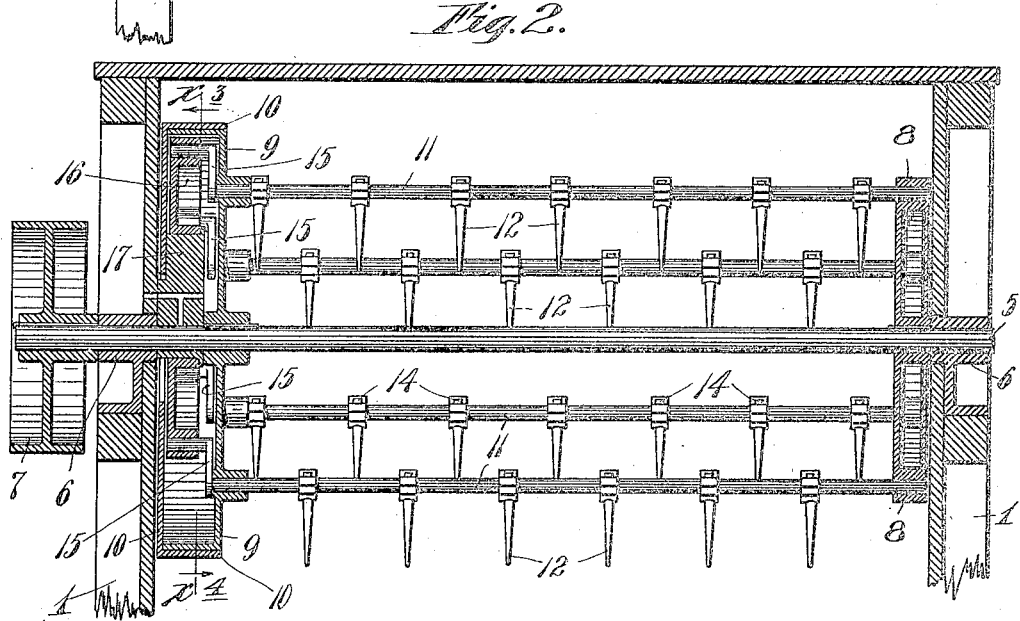
Witnesses.
E. W. Jeppesen.
A. H. Opsahl.
Inventors.
N. P. Noben.
E. E. Wang.
By their Attorneys
Williamson & Merchant No. 817,931. PATENTED APR. 17, 1906.
N. P. NOBEN & E. E. WANG.
ROTARY BEATER FOR THRESHING MACHINES.
APPLICATION FILED AUG. 7, 1905.

2 SHEETS—SHEET 2.

UNITED STATES PATENT OFFICE.

NELS P. NOBEN AND EDWARD E. WANG, OF HITTERDAL, MINNESOTA.

ROTARY BEATER FOR THRESHING-MACHINES.

No. 817,931.  Specification of Letters Patent.  Patented April 17, 1906.

Application filed August 7, 1905. Serial No. 272,954.

*To all whom it may concern:*

Be it known that we, NELS P. NOBEN and EDWARD E. WANG, citizens of the United States, residing at Hitterdal, in the county of Clay and State of Minnesota, have invented certain new and useful Improvements in Rotary Beaters for Threshing-Machines; and we do hereby declare the following to be a full, clear, and exact description of the invention, such as will enable others skilled in the art to which it appertains to make and use the same.

Our invention has for its especial object to provide an improved rotary beater for threshing-machines; and to this end it consists of the novel devices and combinations of devices hereinafter described, and defined in the claim.

The invention is illustrated in the accompanying drawings, wherein like characters indicate like parts throughout the several views.

Figure 3:
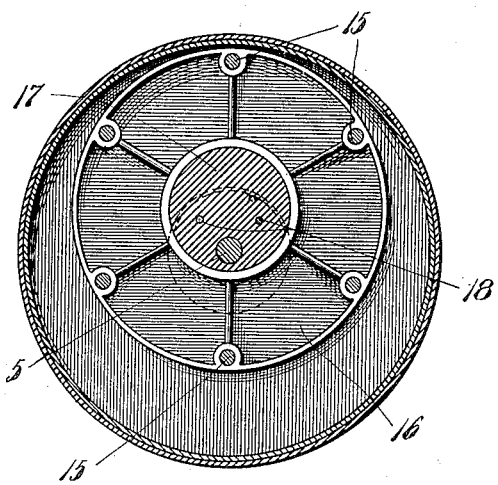
Figure 4:
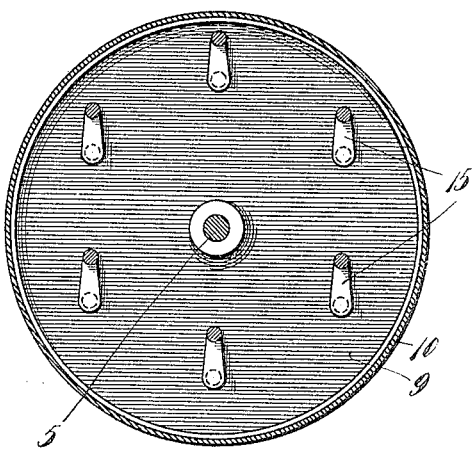
Figure 5:
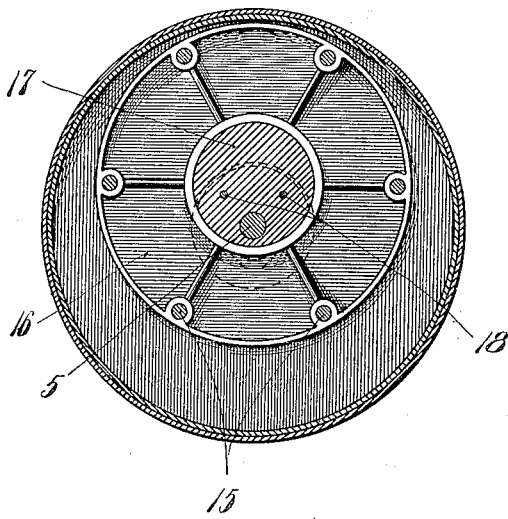
Figure 6:
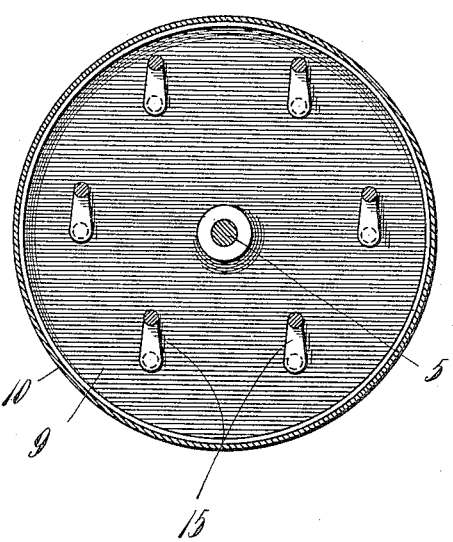

Referring to the drawings, Figure 1 is a view in side elevation with some parts broken away, showing our improved beater applied in working position to a threshing-machine. Fig. 2 is a transverse vertical section taken on the line $x^2 x^2$ of Fig. 1. Figs. 3 and 4 are sections taken on the line $x^3 x^4$ of Fig. 2, the parts shown in Fig. 3 being viewed from right toward the left and the part shown in Fig. 4 being viewed from the left toward the right with respect to Fig. 2; and Figs. 5 and 6 are views corresponding, respectively, to Figs. 3 and 4, but showing slightly-different positions of the parts.

Of the parts of the threshing-machine it is only necessary to note the case 1, the vibratory pan 2, and the shaft 3 of the threshing-cylinder, which shaft is provided at one end with a pulley 4, over which a power-driven belt (not shown) is adapted to run to drive the said cylinder and other parts of the machine.

The improved beater is mounted to work within the case of the machine overlying the straw-pan 2.

The shaft 5 of the improved beater extends transversely of the case 1 and is loosely journaled in bearings 6, rigidly secured on the sides of the said case. At one end said shaft 5 is provided with a pulley 7, over which a power-driven belt is adapted to run to impart rotary movement to said shaft and to the parts of the beater carried thereby.

Rigidly secured to the shaft 5, adjacent to the inner surfaces of one side of the case, is a disk-like head 8, which is preferably formed hollow to adapt it to contain oil or saturated waste. Rigidly secured to the said shaft, adjacent to the inner surface of the other side of the case, is a hollow two-part head made up of telescoped sections 9 and 10, the forward and inner of which sections has its hub keyed or otherwise rigidly secured to said shaft. The two heads 8 and 9 10 carry a plurality of parallel transversely-extended circumferentially-spaced rock-shafts 11, that are provided with fingers 12. These fingers 12 are rigidly but detachably secured to the respective rock-shafts 11, preferably by two-part hinged hubs 13, the free ends of which are drawn together by screws 14 or other suitable devices. These split clamping-hubs permit the fingers to be adjusted on the respective rock-shafts so that they may be accurately alined and set in a vertical position or at any angle to a vertical. Those ends of the rock-shaft 11 that project through the disk-like head-section 9 are provided within the hollow head 9 10 with crank-arms 15, the free ends of which are all pivotally connected to a coupling-ring 16, which coupling-ring works as an eccentric-strap around a non-rotary eccentric 17. This non-rotary eccentric 17 is rigidly secured to the adjacent side of the case 1 by nutted bolts 18, passed through the said two parts. The axis of the eccentric 17 is offset vertically upward from or above the axis of the shaft 5.

The beater-shaft 5 and the heads carried thereby will be rotated in the direction of the arrow marked on Fig. 1, and under the coöperating action of the beater and of the straw-pan 2 the straw will be fed in the direction of the large arrow marked on said straw-pan in Fig. 1. The fingers 12 of the several rock-shafts are always kept turned vertically downward, so that they are brought into action on the straw by a downward vertical movement and are withdrawn from the straw by a vertical upward movement; otherwise stated, the said fingers are given what is customarily designated as a "feathering" movement. This feathering movement is due to the action of the coupling-ring or eccentric-strap, to which the cranks 9 are all connected.

As is evident, the crank connections between the rock-shafts 11 and the eccentric-strap or ring 16 will cause the latter to rotate on the eccentric 17 when the shaft 5 and heads 8 and 9 10 are rotated. The eccentricities of the eccentric 17 and eccentric-strap 16 with respect to the shaft 5 are such that the cranks 9 in all positions of the parts will be held vertically upward and the fingers 12 will be held vertically downward. As indicated in the drawings, Figs. 5 and 6 show the same parts that are shown in Figs. 3 and 4 in the position which they will occupy when the heads are given a step of rotation from a position shown in Figs. 3 and 4 equal to one-half the angular positions between the two adjacent rock-shafts. The web of the head-section 10 makes close engagement with the eccentric 17, and hence oil may be placed within the said head 9 10 as well as within the head 8. Suitable oil-holes may of course be provided wherever found necessary in order to allow the oil to run through the journals of the several parts. The fingers 12 are preferably made of such length that when turned downward they will project below the periphery of the larger head 9 10. These fingers may of course take various forms and other parts of the device may be modified within the scope of our invention as herein set forth and claimed.

What we claim, and desire to secure by Letters Patent of the United States, is as follows:

The combination with a rotary shaft, having a pair of laterally-spaced heads, both of which are hollow and one of which is adapted to contain oil and the other forms a complete inclosing case, of a plurality of pivotally-spaced fingered rock-shafts having crank-arms, a non-rotary eccentric surrounded by said crank-arms, and an eccentric-strap loose on said eccentric and pivotally connected directly to said crank-arms, said eccentric, eccentric-strap and crank-arms all being inclosed by and working within the said hollow case-forming head, substantially as described.

In testimony whereof we affix our signatures in presence of two witnesses.

NELS P. NOBEN.
EDWARD E. WANG.

Witnesses:
 PETER SOLUM,
 J. O. FERAGEN.